United States Patent
Yamada et al.

(10) Patent No.: US 11,021,624 B2
(45) Date of Patent: Jun. 1, 2021

(54) OIL-BASED MAGNETIC INK

(71) Applicant: RISO KAGAKU CORPORATION, Tokyo (JP)

(72) Inventors: Kenji Yamada, Ibaraki (JP); Naofumi Ezaki, Ibaraki (JP); Yoshifumi Watanabe, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 358 days.

(21) Appl. No.: 16/045,399

(22) Filed: Jul. 25, 2018

(65) Prior Publication Data

US 2019/0031901 A1 Jan. 31, 2019

(30) Foreign Application Priority Data

Jul. 25, 2017 (JP) .............................. JP2017-143873

(51) Int. Cl.
| | | |
|---|---|---|
| *C09D 11/36* | (2014.01) | |
| *C09D 11/38* | (2014.01) | |
| *C09D 11/322* | (2014.01) | |
| *C09D 11/326* | (2014.01) | |

(52) U.S. Cl.
CPC ............ *C09D 11/36* (2013.01); *C09D 11/322* (2013.01); *C09D 11/326* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 7,959,822 B2 | 6/2011 | Oetter et al. | |
| 8,236,192 B2 * | 8/2012 | Breton | C09D 11/322 252/62.55 |
| 8,328,345 B2 * | 12/2012 | Watanabe | C09D 11/40 347/100 |
| 8,409,341 B2 * | 4/2013 | Iftime | H01F 1/0054 106/31.6 |
| 8,597,420 B2 * | 12/2013 | Iftime | C09C 1/62 106/31.65 |
| 8,801,954 B2 * | 8/2014 | Iftime | C09C 1/62 252/62.54 |
| 8,974,051 B2 | 3/2015 | Mayo et al. | |
| 9,758,686 B2 | 9/2017 | Nagase et al. | |
| 2009/0321676 A1 * | 12/2009 | Breton | C09D 11/34 252/62.53 |
| 2013/0074727 A1 | 3/2013 | Ando et al. | |
| 2019/0206620 A1 * | 7/2019 | Yamada | H01F 1/445 |
| 2020/0234859 A1 * | 7/2020 | Yamada | B42D 25/369 |

FOREIGN PATENT DOCUMENTS

| | | |
|---|---|---|
| JP | H 02/130902 A * | 5/1990 |
| JP | H06-338050 | 12/1994 |
| JP | 2002-312922 | 10/2002 |
| JP | 2009-500816 | 1/2009 |
| JP | 2012-193366 | 10/2012 |
| JP | 2012-233053 | 11/2012 |
| JP | 2014-234515 | 12/2014 |
| JP | 2016124910 | 7/2016 |
| JP | 2016-150985 | 8/2016 |
| JP | 2016-221807 | 12/2016 |

OTHER PUBLICATIONS

English translation of JP 2012/233053, Nov. 2012; 23 pages.*
English translation of JP 2016/221807, Dec. 2016; 14 pages.*
English translation of JPH 02/130902, May 1990; 6 pages.*
English translation of JP 2002/312922, Oct. 2002; 30 pages.*
Office Action issued in the counterpart Japanese patent application No. 2017-143873, dated Jan. 5, 2021, 5 pages including machine translation.
U.S. Appl. No. 16/235,103, filed Dec. 28, 2018.
U.S. Appl. No. 16/737,622, filed Jan. 8, 2020.

* cited by examiner

*Primary Examiner* — Helene Klemanski
(74) *Attorney, Agent, or Firm* — Hamre, Schumann, Mueller & Larson, P.C.

(57) ABSTRACT

An oil-based magnetic ink can be provided that has low viscosity and improved storage stability. Specifically disclosed is an oil-based magnetic ink containing a magnetic pigment that contains a ferrite, a pigment dispersant A that has an acid value but has no base value, a pigment dispersant B that has an acid value and a base value, and a non-aqueous solvent. One example of the pigment dispersant A is at least one compound selected from the group consisting of hydroxystearic acid and polyhydroxystearic acid. One example of the pigment dispersant B has an acid value of at least 5 mgKOH/g.

11 Claims, No Drawings

OIL-BASED MAGNETIC INK

CROSS REFERENCE TO RELATED APPLICATIONS

This Application is based upon and claims the benefit of priority from prior Japanese Patent Applications No. 2017-143873 filed on Jul. 25, 2017, the entire contents of which are incorporated by reference herein.

BACKGROUND OF THE INVENTION

Field of the Invention

The present invention relates to an oil-based magnetic ink.

Description of the Related Art

Magnetic printing, which is used for forming images containing a magnetic pigment, is a known type of secure printing technique that can be used for printing checks and paper money. One known method for using a magnetic head to read magnetic information that has been printed with a magnetic ink is a magnetic ink character recognition (MICR) system. This magnetic ink contains a magnetic pigment, and an iron oxide or ferrite or the like is generally used.

Examples of other known printing methods conventionally used for magnetic printing, besides methods that use a magnetic ink, include methods that use a magnetic toner or magnetic ink ribbon, but in recent years, for reasons including printing costs, much development has focused on inkjet printing methods using a magnetic ink.

JP 2014-234515 A (Patent Document 1) proposes an ink containing a magnetic pigment in a solution containing a curable monomer as the main component, wherein the ink is described as a magnetic ink that is suitable for digital data lithography.

JP 2016-221807 A (Patent Document 2) proposes a magnetic printing method suited to inkjet printing in which, by printing an oil-based magnetic ink having a magnetic pigment and subsequently printing a color ink having a colorant, an image having favorable magnetic characteristics and a desired hue can be provided. In the examples of Patent Document 2, the magnetic pigment is added to a non-aqueous solvent together with a single dispersant.

JP 2009-500816 A (Patent Document 3) proposes a magnetic fluid formulation that undergoes a change in rheology characteristics under the action of a magnetic field, and is used in shock absorbers, clutches, and brakes and the like. This magnetic fluid formulation contains a base oil, magnetic particles such as a carbonyl iron powder, a dispersant and a thixotropic agent. In the examples of Patent Document 3, inks containing 80% by mass or more of the magnetic particles, a thixotropic agent, and any one of a phosphate ester, a polyhydroxystearic acid and an alkyl resin as a dispersant are investigated for redispersibility and flow behavior.

JP 2012-233053 A (Patent Document 4) proposes an aqueous magnetic inkjet ink containing magnetic particles composed of a cobalt-manganese ferrite represented by $Mn_xCo_yFe_2O_4$ (x+y=1, and x/y is at least 0.5 but not more than 0.9) dispersed in an aqueous dispersion medium, wherein a specific amine salt of diphosphonic acid is used as a dispersion stabilizer.

SUMMARY OF THE INVENTION

One embodiment is an oil-based magnetic ink containing a magnetic pigment that contains a ferrite, a pigment dispersant A that has an acid value but has no base value, a pigment dispersant B that has an acid value and a base value, and a non-aqueous solvent.

DETAILED DESCRIPTION OF THE EMBODIMENTS

In magnetic inks, it is generally necessary to increase the concentration of the magnetic pigment in order to enable characters to be read, but the dispersion stability tends to deteriorate as the concentration of the magnetic pigment is increased, and the change in viscosity over time tends to be particularly marked in high-temperature environments, leading to a problem of poor storage stability. Further, because magnetic pigments have a high specific gravity compared with the pigments used in typical inks, storage stability becomes even more of a problem.

In an inkjet ink, if a magnetic pigment is added in a high concentration, then the ink viscosity increases, and discharge faults from the inkjet nozzles tend to occur. The ink viscosity tends to be more problematic in oil-based inks having a high solvent viscosity than in aqueous inks.

None of Patent Documents 1 to 4 specifically discloses the use of a combination of two or more dispersants.

In Patent Document 1, in order to obtain a curable ink containing a monomer component as the main component, the magnetic pigment can be satisfactorily dispersed with a single dispersant.

In the magnetic ink of Patent Document 2, further investigation is necessary to ascertain whether the ink viscosity and the storage stability can be further improved to enable the magnetic pigment to be added in a higher concentration.

In Patent Document 3, the redispersibility following precipitation of the high concentration of magnetic particles is important, and the magnetic particles are not intended to be maintained in a dispersed state for a long period.

In Patent Document 4, the ink is an aqueous magnetic ink, and considering the known problem of increased viscosity of oil-based inks, simply using the components of an aqueous ink in an oil-based ink would be difficult, meaning further investigation regarding the ink viscosity and the storage stability is necessary.

Furthermore, magnetic particles having a large coercivity and a high residual magnetization, such as the magnetic particles composed of a cobalt-manganese ferrite disclosed in Patent Document 4, are prone to aggregation within the ink. Aggregation of the magnetic particles causes a change in the ink viscosity, and in the case of an inkjet ink, can lead to discharge faults from the inkjet head. If magnetic particles composed of a cobalt-manganese ferrite are used in an oil-based ink, then even if the various dispersants used in Patent Documents 1 to 3 are used, the problems of ink viscosity and storage stability can still not be satisfactorily resolved.

An object of the present invention is to provide an oil-based magnetic ink that has low viscosity and improved storage stability.

The present invention is described below using embodiments. However, examples presented in the following embodiments in no way limit the present invention.

An oil-based magnetic ink according to one embodiment (hereafter sometimes referred to as simply "the ink") contains a magnetic pigment containing a ferrite, a pigment dispersant A that has an acid value but has no base value, a pigment dispersant B that has an acid value and a base value, and a non-aqueous solvent.

As a result, an oil-based magnetic ink having low viscosity as well as improved storage stability can be provided. In particular, the storage stability under high-temperature conditions can be improved. Further, characters formed on a printed item using this ink can be imparted with sufficient magnetic strength to enable magnetic reading.

Magnetic pigments have a large specific gravity, and are therefore difficult to disperse stably within non-aqueous solvents. Even if a large amount of pigment dispersant is added to improve the dispersibility, a satisfactory improvement in the dispersibility is difficult to achieve, and an increase in the ink viscosity often occurs.

Magnetic pigments have functional groups such as hydroxyl groups at the surface of the pigment. These hydroxyl groups at the magnetic pigment surface exhibit acidic or basic properties depending on the surrounding pH. The pigment dispersant A has an acidic functional group, and is thought to interact with the basic hydroxyl groups. Further, the pigment dispersant B has an acidic functional group and a basic functional group, and is thought to interact with both the acidic hydroxyl groups and the basic hydroxyl groups.

By using a combination of the pigment dispersant A and the pigment dispersant B, the dispersant is able to act upon the hydroxyl groups at the magnetic pigment surface regardless of whether the hydroxyl groups at the magnetic pigment surface are in an acidic or basic state, meaning an efficient interaction with the magnetic pigment surface can be achieved. It is thought that, as a result, an oil-based magnetic ink having low viscosity and good storage stability can be obtained.

For example, in those cases where a magnetic pigment such as ferrite particles containing cobalt is used, it is thought that because the pigment contains different elements such as iron and cobalt, the isoelectric point will differ, and it is also thought that at any pH, a mixture of acidic hydroxyl groups and basic hydroxyl groups will exist at the magnetic pigment surface. If a single pigment dispersant is used alone, then the functional group of the pigment dispersant will act primarily against one of either the acidic hydroxyl groups or the basic hydroxyl groups at the magnetic pigment surface, meaning there is a possibility that the interaction with the magnetic pigment surface may be inadequate.

Even in this case, if a combination of the pigment dispersant A and the pigment dispersant B is used then, as described above, an efficient interaction with the magnetic pigment surface is achieved, meaning the viscosity of the ink can be lowered and the storage stability can be improved.

The magnetic ink preferably contains a magnetic pigment.

This magnetic pigment is composed of particles formed from a magnetic material. Although dependent on the type of magnetic material used, if the magnetic material contains no colorant, then black magnetic pigments are the most common.

A ferromagnetic material such as a ferrite can be used favorably as the magnetic pigment.

The ferrite preferably exists in the form of a solid solution with any of various metal oxides. For example, the ferrite may contain any one of cobalt (Co), nickel (Ni), manganese (Mn), barium (Ba), strontium (Sr), copper (Cu), zinc (Zn), or lead (Pb) or the like, or may contain a mixture of two or more of these metals.

Specific examples of the magnetic pigment include ferrite particles containing cobalt, ferrite particles containing cobalt and manganese, and ferrite particle containing barium. In particular, ferrite particles containing cobalt exhibit excellent coercivity and residual magnetization, and are therefore suited to magnetic inks, and by using these particles in combination with the pigment dispersant A and the pigment dispersant B, the ink viscosity and the storage stability can both be improved.

The particle size of the magnetic pigment, reported as a median particle size in the dispersed state, is preferably within a range from 10 nm to 200 nm. If the particle size is smaller than 10 nm, then bleeding increases and the magnetic recognition accuracy of characters can sometimes deteriorate. If the particle size exceeds 200 nm, then precipitation of the magnetic particles can sometimes occur.

The dispersed state median particle size of the magnetic pigment is the volume-based median size determined by a dynamic scattering method, and can be measured, for example, using a nanoparticle analyzer "SZ-100S" manufactured by Horiba, Ltd. This also applies in the following description.

The amount of the magnetic pigment, relative to the total mass of the ink, is preferably at least 1% by mass, more preferably at least 10% by mass, and even more preferably 20% by mass or greater. This ensures that the legibility of the printed image and the magnetic strength can both be enhanced.

The amount of the magnetic pigment, relative to the total mass of the ink, is preferably not more than 60% by mass, and more preferably 50% by mass or less. Although the magnetic pigment has a high specific gravity, by using the pigment dispersant A and the pigment dispersant B, favorable dispersion stability can be maintained even if the magnetic pigment is included in a high concentration.

The oil-based magnetic ink preferably contains a pigment dispersant A that has an acid value but has no base value, and a pigment dispersant B that has an acid value and a base value.

Here, the acid value is represented by the number of milligrams (mg) of potassium hydroxide required to neutralize the acidic component contained within a 1 g sample.

The base value is represented by the number of milligrams (mg) of potassium hydroxide equivalent to the amount of hydrochloric acid or perchloric acid required to neutralize the basic component contained in a 1 g sample.

The acid value and the base value can be measured in accordance with JIS K2501:2003 "Petroleum Products and Lubricants—Determination of Neutralization Number".

The pigment dispersant A preferably has an acid value but has no base value. When the pigment dispersant has an acid value, this indicates that the pigment dispersant contains an acidic group. When the pigment dispersant has no base value, this indicates that the pigment dispersant contains no basic groups.

The acid value of the pigment dispersant A is typically greater than 0 mgKOH/g or at least 1 mgKOH/g, and is preferably at least 5 mgKOH/g, more preferably at least 10 mgKOH/g, and even more preferably 30 mgKOH/g or greater.

The acid value of the pigment dispersant A is typically not more than 200 mgKOH/g, and is preferably not more than 150 mgKOH/g, and more preferably 100 mgKOH/g or less.

The base value of the pigment dispersant A is preferably 0 mgKOH/g.

The pigment dispersant A has no base value, but in those cases where there is a possibility of a trace amount of basic groups in the pigment dispersant A, the pigment dispersant may still be used as the pigment dispersant A provided the base value is not more than 1. Particularly in those cases where the acid value of the pigment dispersant A is at least 10 mgKOH/g, or preferably 30 mgKOH/g or greater, even if the dispersant includes a small amount of a basic group with a base value of not more than 1 mgKOH/g, consideration of the charge balance between the acidic groups and the basic groups means that the dispersant may still be used as the pigment dispersant A.

An anionic pigment dispersant can be used favorably as the pigment dispersant A.

The pigment dispersant A may be a low-molecular weight compound or a polymer compound, and is preferably soluble or dispersible in non-aqueous solvents.

The pigment dispersant A may contain an acidic group such as a carboxyl group or a phosphate group, but is not limited to such compounds.

For example, a single hydroxystearic acid or polyhydroxystearic acid or the like, or a combination of two or more such compounds can be used as the pigment dispersant A.

Examples of commercially available products that can be used favorably as the pigment dispersant A include Solsperse 3000 and 21000 (both product names), manufactured by The Lubrizol Corporation.

The amount of the pigment dispersant A, relative to the total mass of the ink, is preferably at least 0.1% by mass, more preferably at least 0.5% by mass, and even more preferably 1.0% by mass or greater.

The amount of the pigment dispersant A, relative to the total mass of the ink, is preferably not more than 15% by mass, more preferably not more than 10% by mass, and even more preferably 6% by mass or less.

Further, the amount of the pigment dispersant A, reported as a mass ratio relative to a value of 1 for the magnetic pigment, is preferably at least 0.01, and more preferably 0.03 or greater.

The amount of the pigment dispersant A, reported as a mass ratio relative to a value of 1 for the magnetic pigment, is preferably not more than 1, more preferably not more than 0.5, and even more preferably 0.2 or less.

This ensures that the magnetic pigment can be dispersed stably in the ink, the storage stability of the ink can be improved, and any increase in the viscosity of the ink can be prevented.

The pigment dispersant B preferably has an acid value and a base value. When the pigment dispersant has an acid value, this indicates that the pigment dispersant contains an acidic group. When the pigment dispersant has a base value, this indicates that the pigment dispersant contains a basic group.

The acid value of the pigment dispersant B is typically greater than 0 mgKOH/g or at least 1 mgKOH/g, and is preferably at least 5 mgKOH/g, and more preferably 7 mgKOH/g or greater.

The acid value of the pigment dispersant B is typically not more than 200 mgKOH/g, and is preferably not more than 150 mgKOH/g, and more preferably 100 mgKOH/g or less.

The base value of the pigment dispersant B is typically greater than 0 mgKOH/g or at least 1 mgKOH/g, and is preferably at least 3 mgKOH/g, more preferably at least 10 mgKOH/g, and even more preferably 30 mgKOH/g or greater.

The base value of the pigment dispersant B is typically not more than 200 mgKOH/g, and is preferably not more than 150 mgKOH/g, and more preferably 100 mgKOH/g or less.

It is preferable that the pigment dispersant B has a base value that is larger than the acid value. This ensures that the charge balance between the acidic groups and basic groups of the pigment dispersant B can interact with the pigment dispersant A to better improve the storage stability of the ink. In the pigment dispersant B, the difference between the base value and the acid value (base value–acid value) is preferably not more than 150, and more preferably 100 or less. Further, in the pigment dispersant B, the difference between the base value and the acid value (base value–acid value) is preferably at least 10, and more preferably 20 or greater.

Amphoteric dispersants, anionic dispersants that have a basic group, and cationic dispersants that have an acidic group can be used favorably as the pigment dispersant B.

The pigment dispersant B may be a low-molecular weight compound or a polymer compound, and is preferably soluble or dispersible in non-aqueous solvents.

The pigment dispersant B may contain an acidic group such as a carboxyl group or a phosphate group, but is not limited to such compounds.

The pigment dispersant B may contain a basic group such as an amino group, but is not limited to such compounds.

Examples of commercially available products that can be used as the pigment dispersant B include Solsperse 13940 (a polyesteramine-based compound), and Solsperse 11200, 28000, 16000 and 17000 (all product names), manufactured by The Lubrizol Corporation; Crodafos O3A, Hypermer KD11 and Hypermer LP5 (all product names), manufactured by Croda Japan K.K.; and HINOACT KF1300M (a product name), manufactured by Kawaken Fine Chemicals Co., Ltd.

The amount of the pigment dispersant B, relative to the total mass of the ink, is preferably at least 0.1% by mass, more preferably at least 0.5% by mass, and even more preferably 1.0% by mass or greater.

The amount of the pigment dispersant B, relative to the total mass of the ink, is preferably not more than 15% by mass, more preferably not more than 10% by mass, and even more preferably 6% by mass or less.

Further, the amount of the pigment dispersant B, reported as a mass ratio relative to a value of 1 for the magnetic pigment, is preferably at least 0.01, and more preferably 0.03 or greater.

The amount of the pigment dispersant B, reported as a mass ratio relative to a value of 1 for the magnetic pigment, is preferably not more than 1, more preferably not more than 0.5, and even more preferably 0.2 or less.

This ensures that the magnetic pigment can be dispersed stably in the ink, the storage stability of the ink can be improved, and any increase in the viscosity of the ink can be prevented.

The total amount of the pigment dispersant A and the pigment dispersant B in the ink is typically from 0.1 to 20% by mass, and preferably from 3 to 10% by mass.

The total amount of the pigment dispersant A and the pigment dispersant B, reported as a mass ratio relative to a value of 1 for the magnetic pigment, is typically from 0.01 to 1, and preferably from 0.1 to 0.3.

The mass ratio between the pigment dispersant A and the pigment dispersant B (pigment dispersant A:pigment dispersant B) is preferably within a range from 10:90 to 90:10, more preferably from 20:80 to 80:20, and may be from 25:75 to 75:25.

By adding the pigment dispersant A and the pigment dispersant B to the ink, the dispersibility and storage stability of the magnetic pigment can be satisfactorily improved, even if no other pigment dispersant is added.

However, other pigment dispersants may also be added to the ink.

Both non-polar organic solvents and polar organic solvents can be used as the non-aqueous solvent. In one embodiment, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, ethylhexyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, isostearyl alcohol, 1-octadecanil, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

In the oil-based magnetic ink, in order to achieve a combination of a low ink viscosity and superior discharge stability, at least one solvent selected from among petroleum-based hydrocarbon-based solvents and fatty acid ester-based solvents is preferably used, and the use of a combination of a petroleum-based hydrocarbon-based solvent and a fatty acid ester-based solvent is particularly preferable.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components described above. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ink according to one embodiment has a low viscosity and good storage stability, and can therefore be used as an inkjet ink. In those cases where an inkjet recording device is used, the ink of an embodiment of the present invention is preferably discharged from the inkjet head based on a digital signal, with the discharged ink droplets being adhered to a recording medium.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 40 mPa·s, more preferably from 5 to 35 mPa·s, and even more preferably from 10 to 30 mPa·s.

In embodiments of the present invention, there are no particular limitations on the recording medium, and examples of media that can be used include printing papers such as plain papers, coated papers and specialty papers.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several µm to several tens of µm are formed with a spacing between fibers of several tens to several hundred µm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.
[Preparation of Inks]
Ink formulations are shown in Table 1 to Table 3. The components were mixed in accordance with the component ratios shown in each of the tables. Each mixture was then placed in a 50 mL container together with zirconia beads, and using a beads mill "Rocking Mill RM05" (a product name) manufactured by Seiwa Technical Lab Co., Ltd., the mixture was dispersed at 60 Hz for 2 hours. Subsequently, the zirconia beads were removed to obtain an oil-based magnetic ink.

The magnetic pigment used was prepared in the following manner. An aqueous magnetic dispersion of HD-2a (a product name), which is marketed commercially by Diversified Nano Solutions Corporation (DNSC) for use in inkjet inks, was dried at high temperature to obtain a magnetic particle powder. This magnetic particle powder was used as the magnetic pigment.

The components used were as follows.
Cobalt-manganese ferrite: a dried powder of the aforementioned HD-2a (a product name) manufactured by DNSC.
Solsperse 3000: manufactured by The Lubrizol Corporation.
Solsperse 21000: manufactured by The Lubrizol Corporation.
Solsperse 11200: manufactured by The Lubrizol Corporation, active component: 50%.
HINOACT KF1300M: manufactured by Kawaken Fine Chemicals Co., Ltd.
Solsperse 28000: manufactured by The Lubrizol Corporation.
Solsperse 13940: manufactured by The Lubrizol Corporation, active component: 40%.
Crodafos O3A: manufactured by Croda Japan K.K.
Solsperse 20000: manufactured by The Lubrizol Corporation.
Isopar L: an isoparaffin-based solvent, manufactured by Exxon Mobil Corporation.
2-ethylhexyl isononanoate: ES108109, manufactured by Kokyu Alcohol Kogyo Co., Ltd.

The dispersants are all commercially available products, and in those cases where a dispersant contains a solvent, the amount of the active component is shown in parentheses.

The acid value and base value of each dispersant is also shown in the tables. The acid values and base values were measured in accordance with JIS K2501:2003 "Petroleum Products and Lubricants—Determination of Neutralization Number". The units for the acid values and base values are mgKOH/g.
[Evaluations]
For each ink, evaluations were performed using the methods described below. The results of these evaluations are also shown in the tables.
(Dispersibility)
The dispersibility of the magnetic pigment during preparation of the ink was evaluated against the following criteria.
A: during the process of removing the beads, the beads and the ink could be readily separated
B: during the process of removing the beads, the viscosity was high enough to make separation of the beads and the ink difficult
(Ink Viscosity)
The ink viscosity was evaluated against the following criteria. The ink viscosity was measured at room temperature (23° C.) using a rheometer ARG2 (manufactured by TA Instruments, Inc.).
A: ink viscosity of 35 mPa·s or less
B: ink viscosity exceeding 35 mPa·s
(Storage Stability)
First, the viscosity of the ink immediately after preparation was measured. Subsequently, 10 mL of the ink was sealed in a screwcap vial and left to stand at 70° C. for 2 weeks. The ink was then sampled, and the viscosity of the ink after standing was measured. The change in viscosity was calculated using the formula below, and then evaluated against the following criteria. Measurement of the ink viscosity was performed using the same method as that described above for the ink viscosity evaluation.

Change in viscosity (%)=(viscosity after standing−viscosity immediately after preparation)/viscosity immediately after preparation×100

A: change in viscosity of not more than ±5%
B: change in viscosity exceeding ±5% but not more than ±10%
C: change in viscosity exceeding ±10%
(Magnetic Signal Strength)
Using a line-type inkjet printer ORPHIS EX9050 (manufactured by RISO KAGAKU CORPORATION), each ink was used to print E13B characters. Subsequently, a reader/scanner FB-20 (a product name) manufactured by Glory Ltd. was used to read the magnetic signal of the obtained printed item using the program FB20MTR (a product name). The magnetic signal strength was evaluated against the following criteria. E13B characters are the standard font used for magnetic ink character recognition (MICR).
A: magnetic signal was able to be detected
B: magnetic signal was not able to be detected

TABLE 1

Ink Formulations and Evaluation Results

| Units: % by mass | | Acid value | Base value | Example 1 | Example 2 | Example 3 | Example 4 | Example 5 |
|---|---|---|---|---|---|---|---|---|
| Magnetic pigment | Cobalt-manganese ferrite | | | 40.0 | 40.0 | 40.0 | 40.0 | 40.0 |
| Dispersant A | Solsperse 3000 | 35 | 0 | — | — | — | — | 6.0 |
| | Solsperse 21000 | 68 | 0 | 6.0 | 6.0 | 6.0 | 6.0 | — |

TABLE 1-continued

Ink Formulations and Evaluation Results

| | Units: % by mass | Acid value | Base value | Example 1 | Example 2 | Example 3 | Example 4 | Example 5 |
|---|---|---|---|---|---|---|---|---|
| Dispersant B | Solsperse 11200 (active component: 50%) | 7 | 38 | 4.0 (2.0) | — | — | — | — |
| | HINOACT KF1300M | 16 | 23 | — | 2.0 | — | — | 2.0 |
| | Solsperse 28000 | 33 | 45 | — | — | 2.0 | — | — |
| | Solsperse 13940 (active component: 40%) | 40 | 91 | — | — | — | 5.0 (2.0) | — |
| | Crodafos O3A | 144 | 5 | — | — | — | — | — |
| Dispersant C | Solsperse 20000 | 0 | 35 | — | — | — | — | — |
| Non-aqueous solvent | Isopar L | | | 25.0 | 26.0 | 26.0 | 24.5 | 26.0 |
| | 2-ethylhyexyl isononanoate | | | 25.0 | 26.0 | 26.0 | 24.5 | 26.0 |
| | Total (% by mass) | | | 100.0 | 100.0 | 100.0 | 100.0 | 100.0 |
| | Total dispersants* (% by mass) | | | 8.0 | 8.0 | 8.0 | 8.0 | 8.0 |
| | Total dispersants*/pigment (mass ratio) | | | 0.2 | 0.2 | 0.2 | 0.2 | 0.2 |
| | Dispersant A*:dispersant B* (mass ratio) | | | 75:25 | 75:25 | 75:25 | 75:25 | 75:25 |
| Evaluations | Dispersibility | | | A | A | A | A | A |
| | Ink viscosity (mPa · s) | | | A | A | A | A | A |
| | Storage stability | | | A | A | B | A | B |
| | Magnetic signal strength | | | A | A | A | A | A |

*Dispersant amounts were calculated as the amount of the active component

TABLE 2

Ink Formulations and Evaluation Results

| | Units: % by mass | Acid value | Base value | Example 6 | Example 7 | Example 8 | Example 9 | Example 10 |
|---|---|---|---|---|---|---|---|---|
| Magnetic pigment | Cobalt-manganese ferrite | | | 40.0 | 40.0 | 40.0 | 40.0 | 30.0 |
| Dispersant A | Solsperse 3000 | 35 | 0 | — | — | — | — | — |
| | Solsperse 21000 | 68 | 0 | 4.0 | 3.4 | 1.7 | 6.0 | 4.5 |
| Dispersant B | Solsperse 11200 (active component: 50%) | 7 | 38 | — | — | — | — | 3.0 (1.5) |
| | HINOACT KF1300M | 16 | 23 | 4.0 | 3.4 | 5.1 | — | — |
| | Solsperse 28000 | 33 | 45 | — | — | — | — | — |
| | Solsperse 13940 (active component: 40%) | 40 | 91 | — | — | — | — | — |
| | Crodafos O3A | 144 | 5 | — | — | — | 2.0 | — |
| Dispersant C | Solsperse 20000 | 0 | 35 | — | — | — | — | — |
| Non-aqueous solvent | Isopar L | | | 26.0 | 26.6 | 26.6 | 26.0 | 31.3 |
| | 2-ethylhyexyl isononanoate | | | 26.0 | 26.6 | 26.6 | 26.0 | 31.3 |
| | Total (% by mass) | | | 100.0 | 100.0 | 100.0 | 100.0 | 100.0 |
| | Total dispersants* (% by mass) | | | 8.0 | 6.8 | 6.8 | 8.0 | 6.0 |
| | Total dispersants*/pigment (mass ratio) | | | 0.20 | 0.17 | 0.17 | 0.20 | 0.20 |
| | Dispersant A*:dispersant B* (mass ratio) | | | 50:50 | 50:50 | 25:75 | 75:25 | 75:25 |
| Evaluations | Dispersibility | | | A | A | A | A | A |
| | Ink viscosity (mPa · s) | | | A | A | A | A | A |
| | Storage stability | | | A | A | A | B | A |
| | Magnetic signal strength | | | A | A | A | A | A |

*Dispersant amounts were calculated as the amount of the active component

TABLE 3

Ink Formulations and Evaluation Results

| | Units: % by mass | Acid value | Base value | Comparative Example 1 | Comparative Example 2 | Comparative Example 3 | Comparative Example 4 |
|---|---|---|---|---|---|---|---|
| Magnetic pigment | Cobalt-manganese ferrite | | | 40.0 | 40.0 | 40.0 | 40.0 |
| Dispersant A | Solsperse 3000 | 35 | 0 | — | — | — | — |
| | Solsperse 21000 | 68 | 0 | 8.0 | — | — | 6.0 |
| Dispersant B | Solsperse 11200 (active component: 50%) | 7 | 38 | — | — | — | — |
| | HINOACT KF1300M | 16 | 23 | — | 8.0 | 2.0 | — |
| | Solsperse 28000 | 33 | 45 | — | — | — | — |
| | Solsperse 13940 (active component: 40%) | 40 | 91 | — | — | — | — |
| | Crodafos O3A | 144 | 5 | — | — | 6.0 | — |

TABLE 3-continued

Ink Formulations and Evaluation Results

| Units: % by mass | | Acid value | Base value | Comparative Example 1 | Comparative Example 2 | Comparative Example 3 | Comparative Example 4 |
|---|---|---|---|---|---|---|---|
| Dispersant C | Solsperse 20000 | 0 | 35 | — | — | — | 2.0 |
| Non-aqueous solvent | Isopar L | | | 26.0 | 26.0 | 26.0 | 26.0 |
| | 2-ethylhyexyl isononanoate | | | 26.0 | 26.0 | 26.0 | 26.0 |
| | Total (% by mass) | | | 100.0 | 100.0 | 100.0 | 100.0 |
| | Total dispersants* (% by mass) | | | 8.0 | 8.0 | 8.0 | 8.0 |
| | Total dispersants*/pigment (mass ratio) | | | 0.20 | 0.20 | 0.20 | 0.20 |
| | Dispersant A*:dispersant B* (mass ratio) | | | 100:0 | 0:100 | 0:100 | — |
| Evaluations | Dispersibility | | | A | A | A | B |
| | Ink viscosity (mPa · s) | | | A | B | B | — |
| | Storage stability | | | C | A | A | — |
| | Magnetic signal strength | | | A | A | A | — |

*Dispersant amounts were calculated as the amount of the active component

As shown in the tables, the ink of each example had low viscosity and exhibited favorable dispersibility and storage stability. Moreover, the magnetic signal strength was satisfactory in the printed item of each example.

In Examples 1 to 5, various types of the dispersant A and the dispersant B were used, and the results were favorable in each case.

Based on Examples 1 to 5, it is evident that the storage stability is further improved when the dispersant B has a base value that is larger than the acid value.

Further, based on Example 9, it is evident that if the acid value of the dispersant B is large, then the storage stability tends to deteriorate.

In Example 2 and Examples 6 to 8, the combinations of the dispersant A and the dispersant B were the same, but the mass ratio between the dispersant A and the dispersant B and the total amount of the dispersant A and the dispersant B were varied, and favorable results were obtained in each case.

Comparative Example 1 was an ink to which the dispersant B was not added, and the storage stability deteriorated.

Comparative Examples 2 and 3 were inks to which the dispersant A was not added, and the viscosity increased.

In Comparative Example 3, a dispersant B having a large acid value and a small base value was used, but this dispersant did not act as the dispersant A, and was unable to prevent an increase in viscosity.

In Comparative Example 4, a comparative dispersant C having no acid value was used in combination with the dispersant A, but the dispersibility was poor, and an ink could not be produced.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based magnetic ink comprising a magnetic pigment that contains a ferrite, a pigment dispersant A that has an acid value but has no base value, a pigment dispersant B that has an acid value and a base value, and a non-aqueous solvent.

2. The oil-based magnetic ink according to claim 1, wherein the pigment dispersant A is at least one compound selected from the group consisting of hydroxystearic acid and polyhydroxystearic acid.

3. The oil-based magnetic ink according to claim 1, wherein the pigment dispersant B has an acid value of at least 5 mgKOH/g.

4. The oil-based magnetic ink according to claim 1, wherein a mass ratio between the pigment dispersant A and the pigment dispersant B satisfies pigment dispersant A:pigment dispersant B=20:80 to 80:20.

5. The oil-based magnetic ink according to claim 1, wherein the non-aqueous solvent is at least one solvent selected from the group consisting of petroleum-based hydrocarbon-based solvents and fatty acid ester-based solvents.

6. The oil-based magnetic ink according to claim 1, wherein the pigment dispersant A has an acid value of at least 10 mgKOH/g, and the pigment dispersant B has an acid value of at least 5 mgKOH/g and a base value of at least 3 mgKOH/g.

7. The oil-based magnetic ink according to claim 1, wherein an amount of the pigment dispersant A, reported as a mass ratio relative to a value of 1 for the magnetic pigment, is from 0.01 to 1, and an amount of the pigment dispersant B, reported as a mass ratio relative to a value of 1 for the magnetic pigment, is from 0.01 to 1.

8. The oil-based magnetic ink according to claim 1, wherein the ink is an inkjet ink.

9. The oil-based magnetic ink according to claim 1, wherein the pigment dispersant B has a base value that is larger than an acid value.

10. The oil-based magnetic ink according to claim 1, wherein a difference between a base value and an acid value (a base value–an acid value) in the pigment dispersant B is at least 10.

11. The oil-based magnetic ink according to claim 1, wherein a mass ratio between the pigment dispersant A and the pigment dispersant B satisfies pigment dispersant A:pigment dispersant B=25:75 to 75:25.

* * * * *